United States Patent [19]

Harner

[11] E Re. 29,667

[45] Reissued June 13, 1978

[54] COMPRESSOR SURGE SENSOR

[75] Inventor: Kermit I. Harner, Windsor, Conn.

[73] Assignee: United Technologies Corporation, Hartford, Conn.

[21] Appl. No.: 680,623

[22] Filed: Apr. 26, 1976

Related U.S. Patent Documents

Reissue of:

[64] Patent No.: 3,809,490
Issued: May 7, 1974
Appl. No.: 356,648
Filed: May 2, 1973

[51] Int. Cl.[2] ..... F01D 17/08; F01D 17/20; F02C 9/02

[52] U.S. Cl. ..... 415/28; 60/39.29; 137/625.61

[58] Field of Search ..... 415/27, 28; 60/39.29; 137/15.1, 625.6, 625.61

[56] References Cited

U.S. PATENT DOCUMENTS

| | | | |
|---|---|---|---|
| 2,837,269 | 6/1958 | Torell | 60/39.29 |
| 3,131,722 | 5/1964 | Abbott et al. | 137/625.6 |

*Primary Examiner*—Carlton R. Croyle
*Assistant Examiner*—L. J. Casaregola
*Attorney, Agent, or Firm*—John D. Del Ponti

[57] ABSTRACT

The disclosure of this invention relates to means for detecting compressor surge by sensing the pressure downstream of the compressor of a turbine type power plant for rapidly opening the compressor bleeds and holding the bleeds open for brief interval after surge disappears. The sensed pressure is admitted to one side of the diaphragm through a laminar flow restrictor for obtaining a lag time constant which increases as pressure decreases.

9 Claims, 4 Drawing Figures

HIGH PRESSURE
DRAIN PRESSURE
HIGH PRESSURE
DRAIN PRESSURE
HIGH PRESSURE

COMPRESSOR SURGE SENSOR

Matter enclosed in heavy brackets [ ] appears in the original patent but forms no part of this reissue specification; matter printed in italics indicates the additions made by reissue.

BACKGROUND OF THE INVENTION

This invention relates to a compressor surge detector for turbine type power plant and particularly to the means for opening the compressor bleeds at a rapid rate to eliminate surge in response to the pressure downstream of the compressor and for holding the bleeds in the open position until after surge subsides.

As is well known in the art, compressor surge for axial flow types of compressors utilized in turbine types of power plant has been a problem that has plagued the aircraft industry since its inception. Compressor surge is defined as that effect which results from stalling a sufficient number of compressor blades so that a momentary reversal of airflow occurs thru the compressor. This causes compressor discharge pressure to drop very rapidly and sometimes results in continued pressure oscillations until some action is taken to eliminate the surge conditions.

While the theory of surge is not readily understood suffice it to say that this rapid change in pressure and the ensuing pressure pulsation not only could interfere with the efficiency of the power plant but can also incur damage or disaster thereto. Thus it is important that means are incorporated to eliminate or prevent surge from occurring. One method of preventing surge from occurring is by opening up bleed valves prior to or at the onset of the oncoming of the surge condition. In the heretofore known open loop types of controls the control is designed to schedule the opening of the bleeds and/or control fuel flow so as to operate the power plant below the surge line which is well defined for each given engine.

It is also well known in the art to measure the compressor discharge pressure and actuate the bleed valves whenever a predetermined pressure change or rate of change occurs. The problem with the latter mentioned method is that when the pressure fluctuation is such to indicate a return to the normal condition the bleed valves are again returned closed, which may occur prior to the elimination of the surge condition. Also the condition may occur where the bleed valves are oscillating between open and closed during the surge condition.

I have found that I can obviate the problems noted above by sensing compressor discharge pressure and sizing a control system so that a predetermined, rapid decrease of sensed pressure will rapidly move a metering valve which ports flow to the bleed actuator so as to open the engine bleed ports. The metering valve is designed to overtravel its null position to supply high pressure to the bleed actuator to maintain the bleeds open.

By incorporating a combination of restrictor and check valve judiciously located and sized, the system will move the metering valve rapidly in a direction to open the engine bleed ports and will cause the metering valve to return to a position which calls for closed bleed ports at a much slower rate. Thus sizing th restrictor and controlling the amount of valve overtravel will determine the time delay before the actuator returns the bleeds to their normal closed position and hence allows the surge conditions to be eliminated before the bleeds are closed.

SUMMARY OF THE INVENTION

An object of this invention is to provide an improved surge detector for a compressor in a turbine type of power plant.

A still further object of this invention is to provide means for detecting surge by measuring the pressure downstream of the compressor of a turbine type power plant, by providing a means for permitting the bleed actuator metering valve to move at one rate in the opening direction and at a slower rate in the closing direction and to build in overtravel in the valve to hold the bleeds open for a prescribed interval after surge has disappeared.

A still further object of this invention is to provide means for detecting surge of a turbine type power plant by sensing the pressure downstream of the compressor and rapidly opening the engine bleeds upon a predetermined pressure change and then holding the bleeds open for predetermined interval after the surge condition disappeared and incorporating a laminar flow restrictor disposed adjacent one side of the diaphragm sensing the pressure.

Other features and advantages will be apparent from the specification and claims and from the accompanying drawings which illustrate an embodiment of the invention.

DESCRIPTION OF THE PREFERRED EMBODIMENT

Figure 1:
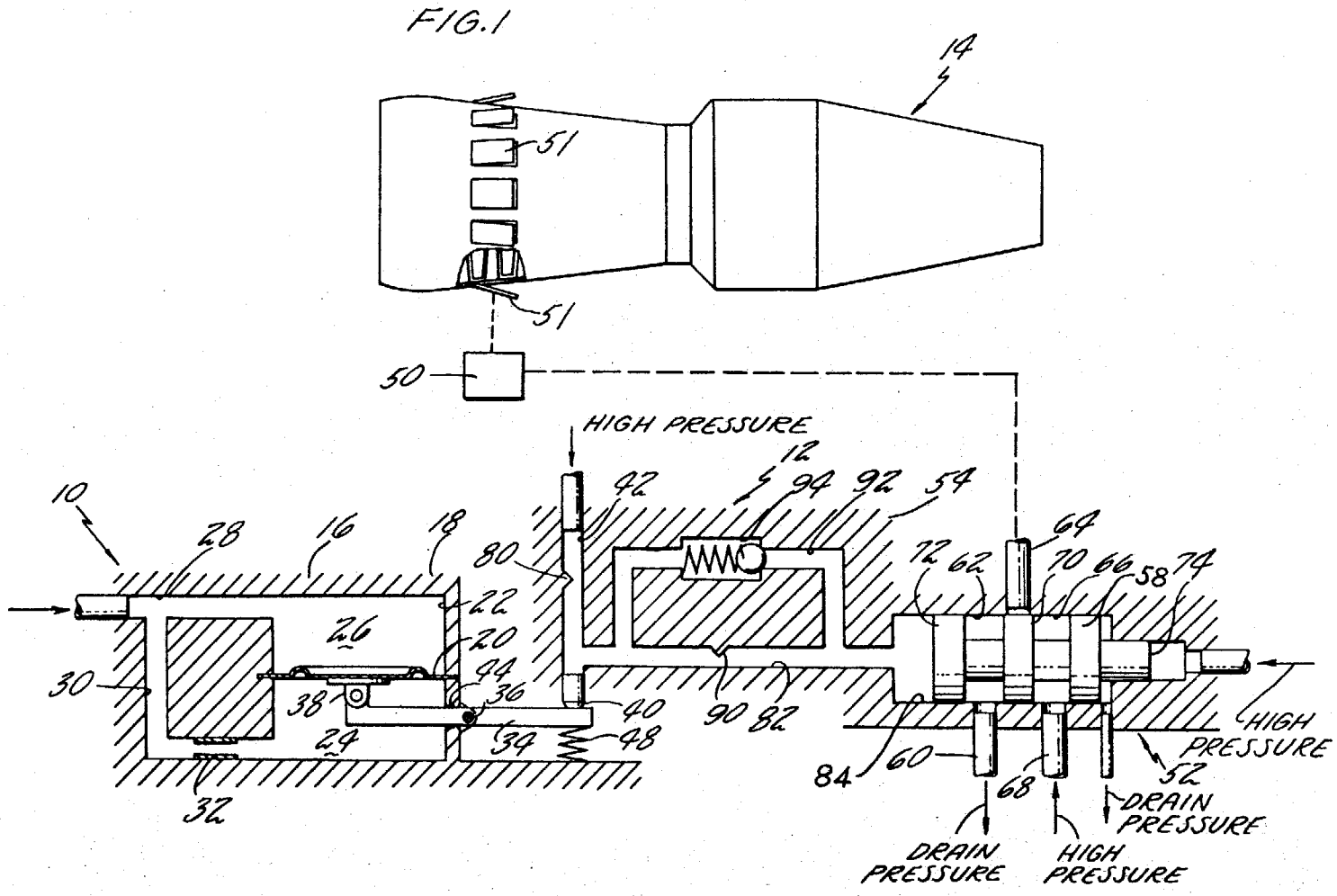
FIG. 1 is a schematic view, partly in section, showing the details of the invention.

As can be seen in FIG. 1 the surge detecting control is comprised of two major assemblies, one being the pneumatic sensing mechanism generally illustrated by numeral 10 and the other is the hydraulic control and actuator generally illustrated by numeral 12. The purpose of the pneumatic sensor is to sense rapid rates of decrease of compressor discharge pressure (CDP) which exceed the maximum decrease pressure rates which occur in normal operation and are indicative of an engine surge. This is accomplished by sensing CDP in the engine generally illustrated by numeral 14 which is any type of turbine power plant by suitable pressure sensor 16. Sensor 16 comprises a housing 18 supporting diaphragm 20 extending across chamber 22 to define a pair of subchambers 24 and 26. Unrestricted flow from the compressor is admitted into chamber 26 via line 28 and restricted flow, also communicating with the compressor is admitted through line 28 and branch line 30 via the restrictor 32 to chamber 24. Restrictor 32 in this instance is a laminar flow restrictor and its purpose will be further described hereinbelow. One arm of flapper arm 34 suitably pivoted to the housing 18 by pivot 36 is attached to the diaphragm 20 by the attaching and pivot member 38. Thus movement of diaphragm 20 is transmitted by the flapper through housing 18 to open and close the orifice 40 formed at the end of the pipe 42. Inasmuch as the side externally of housing 18 is exposed to hydraulic fluid and internally of housing 18 is exposed to pneumatic a suitable seal 44 is incorporated to prevent the contamination of either side. Spring 48 serves to preload the flapper to set the value at which the flapper arm will rotate about pivot 36 and whose value is selected so as to be coincident with the transition point from where normal operation of the compressor takes place and where surge occurs. Thus, exceeding the value selected by the spring 48 (which may be adjustable) will cause the flapper to rotate about pivot 36 to open and close orifice 40.

The purpose of the hydraulic actuating system is to control the position of the bleed valves so as to be opened very quickly and continue to remain open until after the surge has subsided. This hydraulic servo system is comprised of a suitable hydraulic actuator identified by reference numeral 50 which positions bleed valves 51 schematically illustrated to open and close as desired, spool valve generally illustrated by numeral 52 and the time delay mechanism generally illustrated by numeral 54. The hydraulic actuator 50 may be of any suitable type and a description thereof is omitted herefrom for the sake of clarity and simplicity. Suffice it to say that actuator 50 is of the type that includes a piston having a chamber for admitting hydraulic servo fluid to position the piston and interconnecting linkage to synchronously position bleed valves 51. Spool valve 52 includes spool 58, movable rectilinearly, which serves to direct either high pressure, through line 68, annulus 66 and line 64 to actuator 50, or drain pressure from actuator 50 through line 64, annulus 62 and drain line 60. Obviously land 70, when positioned to the right, communicates line 60 with line 64 and, when positioned to the left, communicates line 64 with supply pressure line 68.

Spool 58 of spool valve 52 is of the half-area type wherein the end-face 74 equals half the area of end face 72. The high supply pressure is continuously acting on end face 74 and controlled pressure acts against end face 72. Thus half of the pressure value acting on end face 72 is all that is necessary for balancing the valve. To vary the pressure from the one-half value causes spool 58 to translate. Obviously, flapper 40, serves to regulate the pressure acting on end-face 72 of spool 58.

As is apparent from the foregoing, the increase in curtain area of flapper 40 serves to control the pressure drop across fixed restrictor 80 disposed in line 42 which in turn regulates the pressure in the branch line 82 which communicates directly with chamber 84 for acting on the end face 72 of spool valve 58. Thus an increase in curtain area of flapper valve 40 will increase the pressure drop across fixed restriction 80 and cause a drop in pressure in line 82. The high pressure acting on end face 74 in turn will position spool 58 leftwardly. Conversely, a decrease in curtain area of flapper 40 serves to decrease the pressure drop across fixed restriction 80 hence increasing the pressure in line 82 and consequently, the pressure in chamber 84, thus urging the spool 58 rightwardly. It is therefore apparent that the position of flapper 40 has direct control over the movement of spool 58 which in turn positions actuator 50 for opening and closing bleeds 51.

As noted from the sole figure, fixed restriction 90 is disposed in branch line 82 and serves to restrict the flow passing therethrough. Thus flow from regulated supply pressure ($P_H$) must flow thru orifice 80 and 90 and thru branch line 82 to chamber 84. The orifices 80 and 90 serve to limit the slew rate of the spool valve 58 when it is moving toward the right. Motion of the spool valve toward the right will cause the actuators to close after the spool valve 58 reaches a position where it connects line 64 to drain line 60 thru annulus 62.

When the curtain area of flapper 40 is opened flow is drained from chamber 84 and spool 58 is moved to the left. Much of the flow is shunted around fixed restriction 90 through shunt line 92 where it passes through check valve 94. Since the area of the opening of the check valve 94 is much larger than the area of the fixed restriction 90 it offers less resistance to flow and hence the flow exiting chamber 84 is much faster than flow egressing thereto. Flow out of chamber 84 moves the spool 58 to the left which will cause the actuator 50 to open the bleeds when spool 58 has moved sufficiently far to the left to communicate supply pressure thru line 68, annulus 66 and line 64 to the actuator. This it is apparent that spool 58 moves rapidly in a direction to open the bleeds and returns slowly in a direction to close the bleeds by virtue of the combination orifice 90 and check valve 94 just described.

Assuming for the moment that a surge in the compressor is imminent which would occasion a quick reduction in pressure at the discharge end causing flow to bleed from chamber 26 which will be much faster than flow out of chamber 24 in view of the fixed laminar restrictor 42. This change in pressure will cause a pressure drop across diaphragm 20 which, in turn, will cause diaphragm 20 to move in the upward direction rotating flapper arm 34 in a clockwise direction. The flapper arm bearing against spring 48 will overcome the force if the surge signal is strong enough causing the curtain area to increase. This increase in curtain area causes an increase in flow in line 42 and hence increases the pressure drop across fixed restriction 80 which in turn decreases the pressure evidenced in line 82 and hence in chamber 84. The effect of this is to cause the spool 58 to translate in the leftward direction and supply high pressure to the actuator 50 thru line 68, annulus 66 and line 64 and consequently position the bleed valves in the open position. Because the flow exiting out of chamber 84 is shunted around fixed restriction 90 bypassing through the line 92 and check valve 94, the flow is virtually unrestricted and moves at a substantially fast rate. Of course, check valve 94 is designed to impose as small a pressure drop as possible. Thus it is apparent that a substantial drop in pressure in the discharge end of the engine compressor will cause the actuator to open the bleed valves in as quick a manner as possible. The problem is to prevent the bleed valves from closing before surge subsides. Thus if the bleed valves close too quickly surge would ensue before the bleed valves could be made to reopen.

Spool 58 in this instance begins metering flow to open the bleed actuators very quickly and then is permitted to overtravel and thus continuously supply high pressure to open the bleeds. Thus if pressure in line 82 cycles, spool valve will cycle slightly, also. However, it will always remain in the region where it is metering high pressure to keep the bleeds open. Because spool 58 moves rapidly in one direction and slowly in the other it will tend to remain near its saturated position metering high pressure to open the bleed actuators.

After the surge disappears and compressor discharge pressure stabilizes spool valve 58 will slowly return to the position which closes the bleed valve 51. The sizing of the orifice 90 and the amount of overtravel of spool 58 from the null position will determine the time required to close the actuator.

Figure 2A:
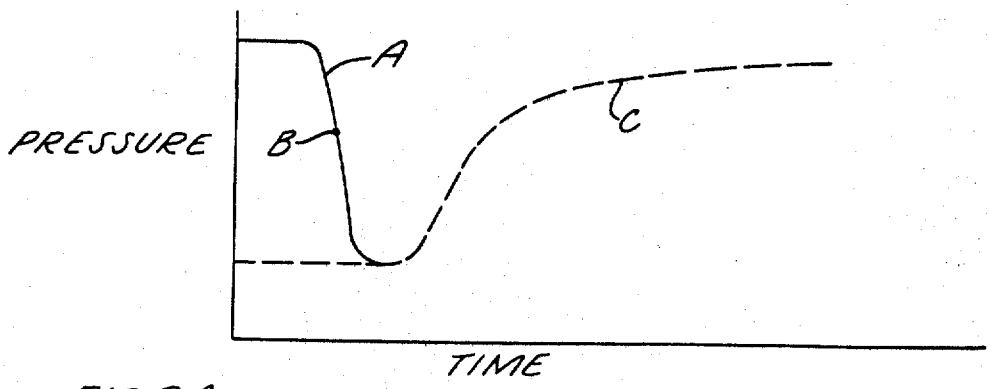
FIG. 2A is a graph plotting the compressor discharge pressure vs. time.
Figure 2B:
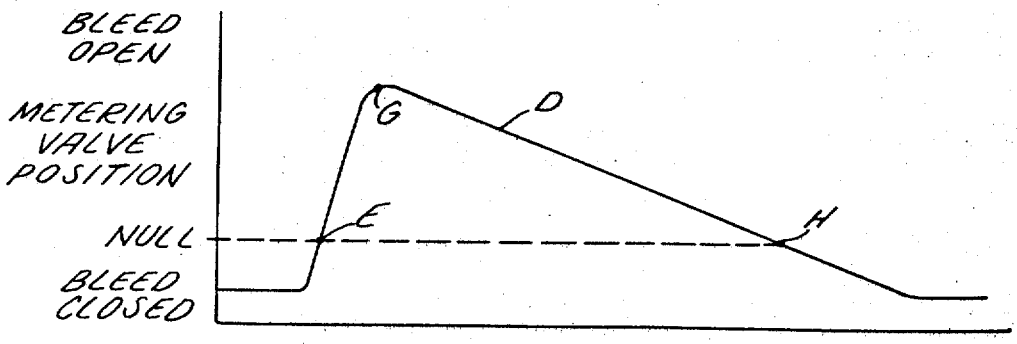
FIG. 2B is a graph plotting metering valve position vs. time.
Figure 2C:
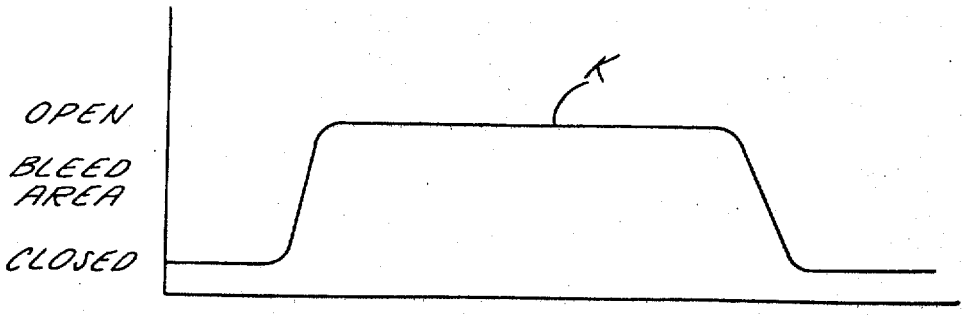
FIG. 2C is a graph plotting bleed area vs. time.

From the foregoing it is apparent that this system provides a simple means for detecting compressor surge, rapidly opening the engine bleeds to eliminate surge, and then holding the bleeds for a prescribed interval if the surge disappears. This is exemplified more fully by referring to the graphs shown in 2A, 2B and 2C which are plots of CDP, spool valve position, and bleed actuator position versus time. As noted graph 2A depicts a situation where surge has occurred and hence the drastic drop in pressure is evidenced in the discharge end of the compressor is represented by the solid line curve A. When this pressure reaches a predetermined value say point B the surge detector triggers the actuator to position the bleed valves from full closed to full open. As surge subsides where CDP returns to its stabilized level as evidenced by the dashed line C spool valve will begin to respond to move actuator 50 and hence bleed valves 51 to the closed position. However, due to the overtravel (between points E and G of curve D) built into spool valve 58, as it proceeds to close along the negative shape of curve D it will continue to meter servo pressure to actuator 50 to hold the bleeds opened a predetermined time. Points G to H of curve D represents the rate of travel of spool 58, which obviously is a lower rate than the opening value from points E to G. This will assure that surge has completely subsided before the bleed valves are allowed to start closing. FIG. 2C shows the resulting bleed actuator position as represented by the curve K.

As noted above the diaphragm 20 of the surge detector senses CDP through a lag time constant at one side. This lag time constant is created by laminar restriction 32 and the volume feeding that side of diaphragm 20. A laminar restriction is employed because it causes the lag time constant to increase as pressure decreases. Although this may be shown by rigorous mathematical derivation, for purposes of understanding this invention this may be demonstrated by the following mathematical derivation.

A lag time constant is defined by the equation:

$$\tau \text{ LAG} = (V\ 128\ \mu\ L)/(\gamma\ D4P)$$

where $V$ = volume
$\mu$ = air viscosity
$D$ = diameter of laminar restriction
$\gamma$ = ratio of specific heats
$P$ = pressure
$L$ = length of laminar restriction The force per unit area felt by the diaphragm is:

$$F/A_D = Ps4 - [Ps4/(\tau s+1)] = (\tau S/[\tau S+1])Ps4 \text{ or}$$
$$F/A_D = [\tau/(\tau S+1)](dPs4/dt)$$

where $\tau$ = volume time constant
$Ps4$ = compressor discharge pressure
$A_D$ = diaphragm area Since $\tau$ is larger at low pressures this tends to cause lower rates of change of pressure to be detected as surge at the lower pressure levels and allows a fixed $\Delta P$ setting across the diaphragm to be indicative of surge at both sea level and altitude conditions.

It should be understood that the invention is not limited to the particular embodiments shown and described herein, but that various changes and modifications may be made without departing from the spirit or scope of this novel concept as defined by the following claims.

I claim:

1. A surge control system for opening a bleed valve of the compressor section of a turbine type power plant so as to prevent or eliminate surge therein comprising means for sensing the pressure at the compressor for producing a signal whenever a predetermined transitory drop in said pressure occurs, an actuator connected to said bleed valve for opening and closing said bleed valve, control means including a servo valve and servo fluid responsive to said signal for controlling said actuator to position it to an open position, a relatively unrestricted flow line for leading said servo fluid [to] *from* said servo valve to position it from a normally closed bleed valve condition to an opened bleed valve condition, said servo valve movable to overtravel null condition when said servo valve is in the opened bleed valve condition, a restricted flow line for conducting said servo fluid [from] *to* said servo valve to position it to its normally closed bleed valve condition, said restricted flow line and overtravel being dimensioned so as to permit said bleed valves to remain open over a predetermined amount of time subsequent to said transition drop in pressure returns to substantially its original value, and said unrestricted flow line being sized to position said servo valve in the opened bleed valve condition at a relatively rapid rate.

2. A surge control system as claimed in claim 1 wherein said sensing means includes a fluid reaction means having opposing surfaces subjected to the pressure in the compressor, and a laminar flow restriction disposed between one of said reaction surfaces and the compressor.

3. A surge control system as claimed in claim 2 wherein said reaction means is a diaphragm.

4. A surge control system as claimed in claim 3 including a check valve disposed in said unrestricted flow line to prevent servo fluid flowing out of said servo valve to pass therethrough.

5. A surge control system as claimed in claim 4 including a flapper valve controlled by said diaphragm for porting and bleeding fluid to and from said servo valve.

6. A surge control system as claimed in claim 1 wherein said pressure is the pressure at the discharge end of the compressor.

7. A surge controller for an engine comprising in combination, means for sensing surge condition in said engine by detecting the rate at which the pressure where surge is occurring drops for producing a signal, means for subsiding the surge condition by adjusting the airflow through said engine, an actuator connected to said means, metering means having a null position for controlling said actuator by the application of fluid pressure, a controller responsive to said signal having a restricted and unrestricted flow line porting and bleeding fluid to and from a reaction surface for positioning said metering means from its null position, said unrestricted flow line being sized to port fluid at a rate to rapidly position said actuator to rapidly effect the flow in said engine and position said metering means to overtravel the null position, and said restricted flow line shunting said unrestricted flow line to reduce the rate in which said metering means returns to its null position, the extent of overtravel and the dimension of said restricted flow line being selected to assure that surge subsides prior to reaching said null position.

8. A surge controller as claimed in claim 7 wherein said sensing means includes a diaphragm having one face exposed to unrestricted communication to the engine and the opposing face exposed to restricted communication to said engine.

9. A surge controller as claimed in claim 8 wherein said restricted communication includes a laminar flow restrictor.

* * * * *